United States Patent [19]

Kump et al.

[11] Patent Number: 4,701,386
[45] Date of Patent: Oct. 20, 1987

[54] BATTERY COMPRISING DUAL TERMINAL BUSHINGS

[75] Inventors: William H. Kump, Mendota Heights; Joseph J. Jergl, Minneapolis, both of Minn.

[73] Assignee: GNB Incorporated, Mendota Heights, Minn.

[21] Appl. No.: 17,516

[22] Filed: Feb. 24, 1987

Related U.S. Application Data

[62] Division of Ser. No. 770,946, Aug. 30, 1985, Pat. No. 4,645,725.

[51] Int. Cl.[4] .............................................. H01M 2/30
[52] U.S. Cl. .................................... 429/179; 429/180; 429/181
[58] Field of Search .............................. 429/178–183, 429/121

[56] References Cited

U.S. PATENT DOCUMENTS

| | | | |
|---|---|---|---|
| 1,089,549 | 3/1914 | Halbleib | 320/5 |
| 3,871,924 | 3/1975 | DeMattie et al. | 429/176 |
| 4,042,762 | 8/1977 | Hakarine | 429/187 |
| 4,064,328 | 10/1977 | Cllen | 429/121 |
| 4,143,215 | 3/1979 | Mocas | 429/179 |
| 4,272,592 | 6/1981 | Miyagawa | 429/161 |
| 4,278,742 | 7/1981 | Oxenreider et al. | 429/88 |
| 4,304,827 | 12/1981 | Clingenpeel | 429/179 |
| 4,371,591 | 2/1983 | Oxenreider et al. | 429/175 X |
| 4,424,264 | 1/1984 | McGuire et al. | 429/178 |
| 4,425,414 | 1/1984 | Solomon | 429/178 X |
| 4,444,853 | 4/1984 | Halsall et al. | 429/178 X |

FOREIGN PATENT DOCUMENTS 56-175964 12/1981 Japan .

Primary Examiner—Anthony Skapars
Attorney, Agent, or Firm—Augustus J. Hipp; Keith B. Willhelm

[57] ABSTRACT

A dual terminal, electric storage battery is provided. The battery comprises: a container; a cover; a single pair of element posts in electrical communication with electrochemical components; a single pair of terminal bushings substantially completely embedded in the cover, each of the bushings are electrically connected to one of the element posts and comprises, a main body portion, a side terminal end, which side terminal end is mounted through an opening in an angled surface of the cover, which angled surface is at an angle acute to the plane generally contiguous to the top surface of the cover, a top terminal end which is mounted through an opening in the top surface of the cover on or in the vicinity of its longitudinal centerline, an element post end, and a connecting arm extending sideways from the body portion to the side terminal end, and wherein the top terminal end, the body portion, and the element post end define a hole passing axially therethrough and adapted to receive therein one of the element posts; a pair of side terminals in electrical communication with the side terminal ends of the bushings; and a pair of top terminals in electrical communication with the top terminal ends of the bushings.

12 Claims, 7 Drawing Figures

BATTERY COMPRISING DUAL TERMINAL BUSHINGS

This is a divisional of U.S. Ser. No. 770,946, filed on Aug. 30, 1985, now U.S. Pat. No. 4,645,725.

This invention relates to multicell electric storage batteries, and more particularly, to dual terminal, lead-acid automotive starting, lighting, and ignition (SLI) batteries.

BACKGROUND OF THE INVENTION

Most automobiles require, in terms of terminal arrangement, one of two general types of lead-acid automotive batteries: top terminal and side terminal. Top terminal batteries are provided with terminals, commonly of a post configuration, upstanding through the top wall of the battery cover in two of its corners, usually two corners separated by one of the longer sides of the cover. Examples of such terminal arrangements are disclosed, e.g., in U.S. Pat. No. 4,042,762 to D. Hakarine and U.S. Pat. No. 3,871,924 to D. DeMattie et al. Batteries must be connected to the automobile with correct polarity. Thus, car manufacturers generally provide terminal connections which are no longer than necessary to ensure proper connection to the battery. Such customized terminal connections, depending on their polarity, require either "left-handed" or "right-handed" batteries, which batteries are identical except for the reversal of terminal polarity. Consequently, many battery manufacturers have produced both kinds. In an effort to standardize, i.e., to produce a single type of top terminal battery which will fit both types of terminal connections, some manufacturers now provide top terminal batteries with the terminal posts located near the ends and near or on the longitudinal center line of the battery cover. Examples of such centered top terminal arrangements are disclosed, e.g., in U.S. Pat. No. 4,444,853 to V. Halsall et al. (FIGS. 11-12); U.S. Pat. No. 4,278,742 to T. Oxenreider et al.; and U.S. Pat. No. 4,371,591 to T. Oxenreider et al. By centering the top terminals near or on the longitudinal center line and by rotating the battery 180 degrees as needed, centered top terminal batteries accommodate both left- and right-handed terminal connections.

Batteries having side terminals constitute a second type of battery. In such batteries, the terminals generally are located near the top and ends of a vertical sidewall, usually the longer sidewall of the battery container or cover. Typically, side terminals are threaded to accept connector bolts which fasten the terminal connections to the terminals. The location of side terminals, however, typically makes it difficult to connect the terminal connections. Examples of such side terminal batteries are disclosed, e.g., in Halsall '853 (FIGS. 9-10); U.S. Pat. No. 4,304,827 to W. Clingenpeel; U.S. Pat. No. 4,272,592 to S. Miyagawa; and U.S. Pat. No. 4,143,215 to V. Mocas.

In a further effort to standardize batteries to fit both top and side terminal requirements, some manufacturers have made or proposed dual terminal batteries. Although the name is somewhat of a misnomer because it implies that the battery has two terminals, dual terminal batteries actually have four terminals: a pair of top terminals and a pair of side terminals. Examples of dual terminal batteries are disclosed, e.g., in U.S. Pat. No. 4,424,264 to M. McGuire et al. and Japanese Pat. No. 56-175964. Particularly when the top terminal pair is centered i.e., situated on or near the longitudinal center line of the battery, dual terminal batteries in theory can achieve great success in standardization. For that reason, they represent a substantial advance in the art and potentially a significant means for reducing the large, costly inventories which battery manufactures and retailers must maintain.

Regardless of the arrangement of their terminals, however, lead-acid batteries typically share certain features. The electrochemical components commonly are set within a solid right rectangular shaped container made of an injection molded thermoplastic, such as polypropylene. The interior of the container is divided by partition walls into a series of cells and within each cell is disposed an electrode stack in contact with electrolyte, e.g., a sulfuric acid based electrolyte.

The electrode stacks comprise alternate positive and negative plates and a separator between each adjacent plate pair. The positive and negative plates of each cell stack are connected in parallel, respectively, by positive and negative conductive straps. The electrode stacks in turn are connected in series by at least one intercell connection between the conductive straps. The conductive straps of each inner cell group generally have one such intercell connection, although multiple intercell connections are known. The conductive strap in each of the two end cells is a terminal conductive strap, and is, as the name implies, electrically connected to the positive and negative plates and the corresponding positive or negative battery terminals typically through, inter alia, an element post integrally formed with the respective terminal conductive strap.

Regardless of the terminal arrangement, bushings generally are used to electrically connect the terminals to the element posts. Typically, they are mounted in the battery cover or container sidewall and are designed to accept and be welded to the element posts during assembly of the battery. Such bushings are disclosed, e.g., in Halsall '853 (in top and side terminal batteries); McGuire '264 (in dual terminal batteries); and Japanese Patent '964 (in dual terminal batteries). The terminals themselves, in the case of the side terminals, typically comprise hard metal, threaded nuts cast into the side terminal bushings. The top terminals, on the other hand, generally result from the fusion of end portions of the lead-alloy, top terminal bushing with the lead or lead-alloy element posts or are a separate piece subsequently attached to the welded bushing and element post. The bushings should conduct electricity to the terminals efficiently and with sufficiently high rates. Moreover, to the extent possible in dual terminal batteries, electrical conduction to one set of terminals should not be compromised in favor of the other set of terminals.

The bushing also must not create or exacerbate the problem of electrolyte and gas leakage from the interior of the battery to the ambient. Generally speaking, electrolyte to some degree may creep along each seal between each part of the battery, especially if there is an imperfect seal. More specifically, electrolyte creepage can occur at the plastic to plastic heat seal between the battery container and cover, between the bushings and the plastic, and between the bushings and the element posts. While electrolyte creepage is a problem in all types of lead-acid batteries, it is a more acute problem in wet, maintenance-free, dual terminal batteries.

In recombinant, as compared to wet batteries, there is substantially no free electrolyte in the cells. The major portion of the electrolyte, i.e., approximately 70%, is restrained in the highly absorbent microfine glass fiber separator material between the positive and negative plates. Accordingly, there is less electrolyte creepage because the electrolyte, in effect, is immobilized to a significant degree. In wet batteries electrolyte generally fills the cells to a level substantially above the top of the cell plates, especially in maintenance-free wet batteries where excess electrolyte is necessary to ensure long service life. The problem of electrolyte creepage, therefore, is a major concern because the electrolyte tends to splash and slosh through the interior during transportation, installation, and use of the battery.

Dual terminal batteries, because they comprise side terminals as well as top terminals, are particularly prone to leakage because the side terminals typically are mounted through a vertical sidewall of either the container or the cover. For that reason, the seal between the bushing and plastic in a side terminal is located lower than that in a top terminal and, therefore, nearer to and generally below the electrolyte level. Moreover, if the terminal is mounted through the cover sidewall, the seal between the cover and container also must be lower and, therefore, closer to and generally below the electrolyte level as well.

Electrolyte creepage not only reduces the amount of electrolyte in the cells, but it can corrode the terminals and impair conductivity to the terminal connections as well. The acid in the electrolyte also is harmful to skin, clothing, and other materials which it contacts.

Gas leakage, however, also poses problems. Gases evolved while charging the battery can leak through the various seals, particularly around the bushing if the weld to the element post is faulty. A faulty weld between the bushing and the element post also may result in a gap which may allow electricity to arc.

Additionally, both electrolyte and gas leakage tend to increase over the life of the battery. The battery is subject to ordinary wear and tear, principally caused by vibration from the vehicle in which it is installed. Additionally, during the life of the battery, the plates tend to grow, i.e., they expand and, via the terminal conductive straps and element posts, can stress the element post/bushing weld. In the course of shipping and installation the battery typically is subjected to rough treatment and mishandling as well, e.g., dropping the battery or knocking or overtightening the terminal connections. Consequently, the various seals in the battery deteriorate and become more susceptible to leaking. Rough treatment not only weakens and breaks the various seals, but also may cause the bushing to break. Moreover, a break in the bushing or in the bushing/terminal weld may result in a gap which allows electricity to arc.

To summarize, dual terminal batteries having centered top terminals are preferred over conventional side and top terminal batteries because such dual terminal batteries can be mounted in a wider variety of vehicles. Unfortunately, despite the clear need for a reliable dual terminal battery and primarily due to the design of their bushings, such batteries do not appear to have achieved a high degree of success in eliminating electrolyte and gas leakage. Moreover, the seal between the bushing and plastic and between the bushing and element post and the bushing itself has tended to deteriorate and/or break during service. Additionally, dual terminal designs should provide equal electrical conduction to both sets of terminals, however, because of cover design limitations, they are difficult to make and assemble. Side terminals of some dual terminal batteries also are inaccessible and make it difficult to connect the battery to side terminal connectors.

An object of this invention, therefore, is to provide a dual terminal battery having centered top terminals, which battery comprises a bushing which serves to reduce electrolyte and gas leakage.

A further object of this invention is to provide such a battery with a bushing which has increased strength and durability;

Another object of this invention is to provide such a battery with a bushing which conducts electricity to both sets of terminals with substantially equal efficiencies and rates.

Yet another object of the present invention is to provide such a battery to which side terminal connections may be easily connected.

Other objects of the present invention will become apparent to those skilled in the art upon reading the following detailed description and upon reference to the drawings.

SUMMARY OF THE INVENTION

The present invention is directed to a dual terminal, electric storage battery comprising:
 (a) a container;
 (b) a cover;
 (c) a single pair of element posts in electrical communication with electrochemical components;
 (d) a single pair of terminal bushings substantially completely embedded in the cover, each of the bushings being electrically connected to one of the element posts and comprising,
  (i) a side terminal end, which side terminal end is mounted through an opening in an angled surface of the cover, which angled surface is at an angle acute to the plane generally contiguous to the top surface of the cover,
  (iii) a top terminal end, which top terminal end is mounted through an opening in the top surface of the cover on or in the vicinity of its longitudinal centerline,
  (iv) an element post end, and
  (v) a connecting arm extending sideways from the body portion to the side terminal end, and wherein the top terminal end, the body portion, and the element post end define a hole passing axially therethrough and adapted to receive therein one of the element posts;
 (e) a pair of side terminals in electrical communication with the side terminal ends of the bushings; and
 (f) a pair of top terminals in electrical communication with the top terminal ends of the bushings.

Preferred embodiments are directed to said battery wherein the connecting arms have cross sectional areas approximately equal to that of the top terminals, the top terminals are formed by fusing the element posts and the top terminal ends of the bushings, and the bushings comprise one or more ribs.

While this invention will be disclosed and discussed primarily in terms of specific embodiments thereof, it is not intended to be limited thereto. Other modifications and embodiments will be apparent to the worker in the art.

DETAILED DESCRIPTION OF THE INVENTION

Figure 1:
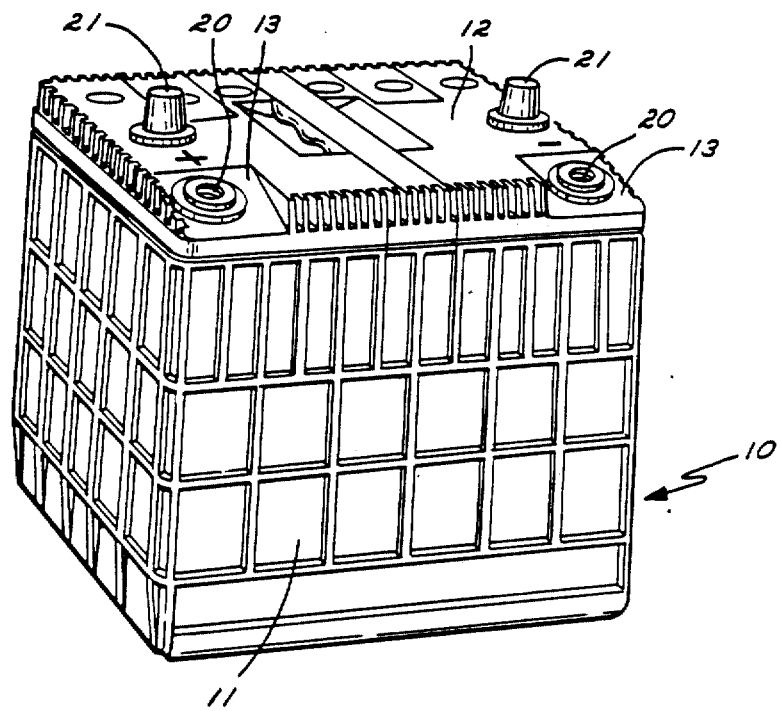
FIG. 1 is a perspective view of a preferred embodiment of the battery of the present invention and illustrating the arrangement of the battery terminals.

FIGS. 1 through 6 show details of a preferred embodiment of the storage battery of the subject invention. It should be noted that the external ridges shown on the container 11 and cover 12 in the perspective view of the preferred battery 10 in FIG. 1 are not shown in the other figures for the sake of simplicity. They form no part of the subject invention.

Figure 2:
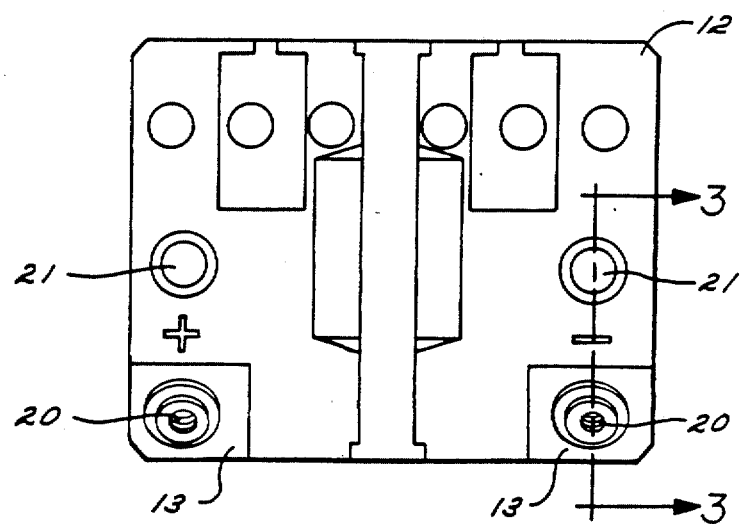
FIG. 2 is a top plan view of the battery shown in FIG. 1 further illustrating its terminal arrangement.

As best shown in FIGS. 1 and 2, the battery 10 is constructed of a generally right rectangular shaped container 11 to which is sealed a cover 12. Except as discussed hereinafter, the particular configuration of container 11 and cover 12 is not considered critical. A wide variety of configurations have been proposed in the arts and may be utilized. In addition, a wide variety of thermoplastic resins and molding techniques are known and may be employed to form the container 11 and cover 12. For example, known injection molding techniques may be used. The material of choice for battery parts of this type is an ethylenepropylene copolymer. Likewise, any of several known techniques for sealing the cover 12 to the container 11 may be used, e.g., heat sealing, with or without adhesives, adhesives alone, or solvents.

As best illustrated in FIGS. 1 and 2, the battery 10 is a dual terminal battery comprising side terminals 20 and centered top terminals 21. The terminals 20 and 21, in accordance with this invention, are connected to a single pair of element posts 30 by a single pair of bushings 40. The single pair of element posts 30 welded, as described in greater detail below, to the single pair of bushings 40 significantly contributes to the construction of strong, reliable, and leakproof connections. By providing a single pair of bushings 40 and a single pair of element posts 30, the number of element post/bushing welds through which leakage can occur is two, the absolute minimum which can be achieved. In comparison to the four welds required in some conventional dual terminal batteries, not only are labor costs reduced, but the likelihood of faulty welds is cut in half as well.

Figure 3:
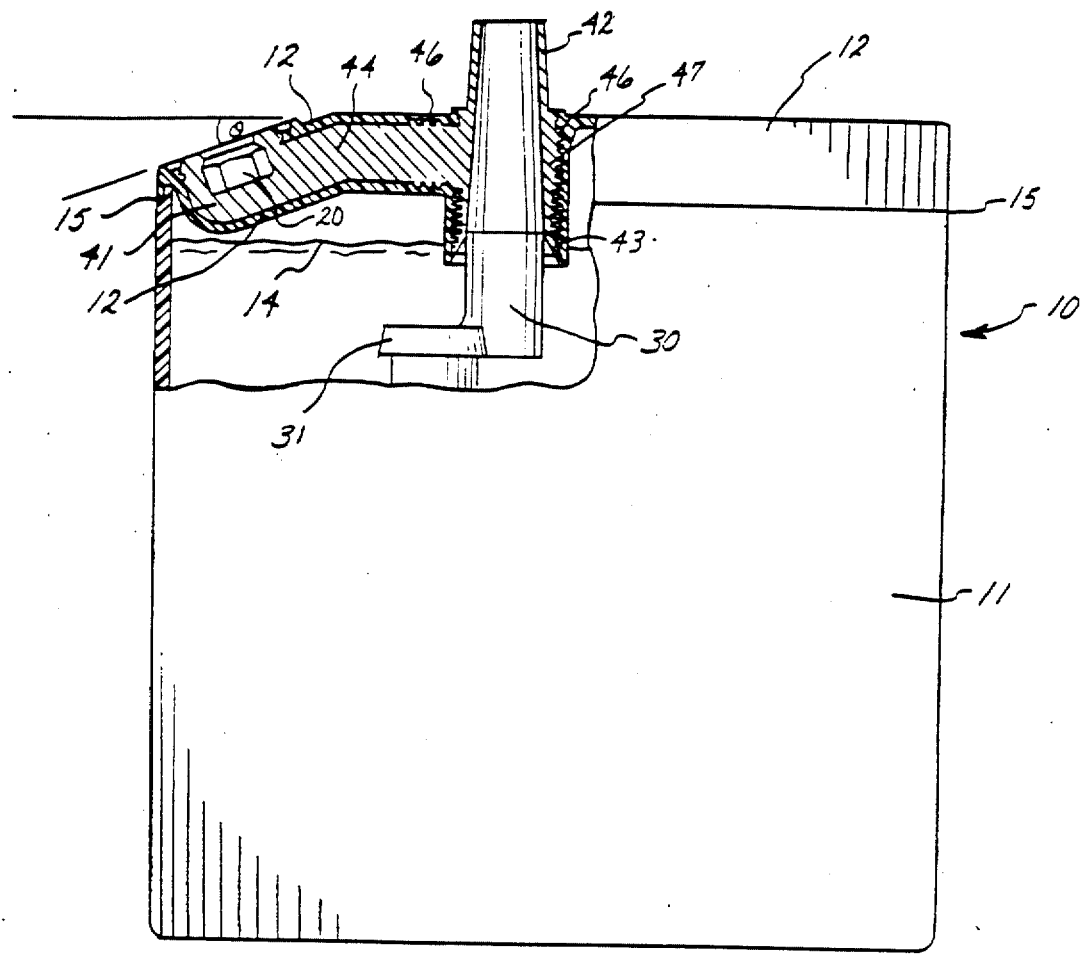
FIG. 3 is a partial sectional view taken generally along line 3—3 of FIG. 2 showing certain details of the bushing 40.
Figure 5:
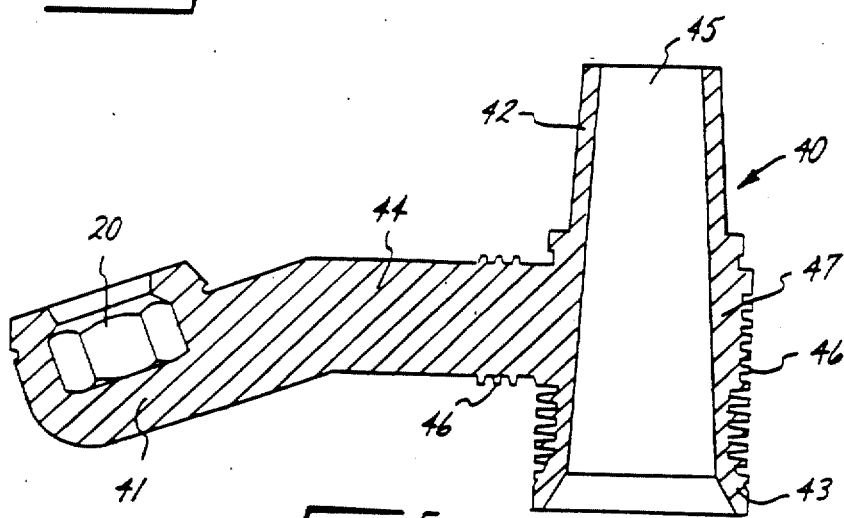
FIG. 5 is an enlarged, cross-sectional view of bushing 40 shown in FIG. 3 further illustrating certain of its preferred details.
Figure 6:
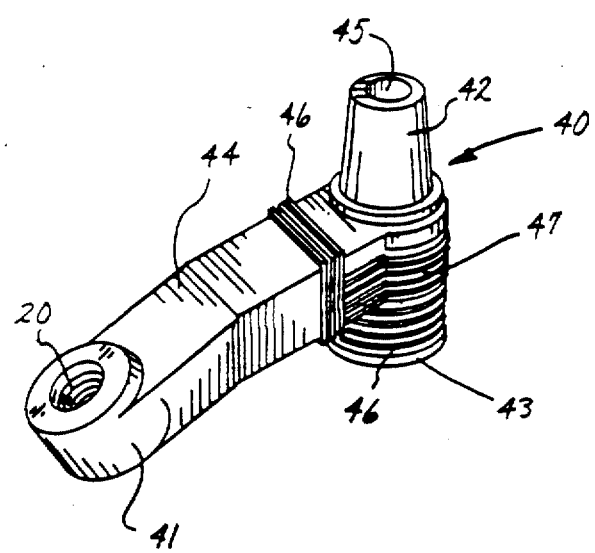
FIG. 6 is a perspective view of bushing 40 shown in FIG. 3 further illustrating certain of its details.

As best shown in FIGS. 3, 5 and 6, the bushing 40 of one preferred embodiment of the subject invention comprises a body portion 47, a side terminal end 41, a top terminal end 42, an element post end 43, a connecting arm 44, and a generally cylindrical hole 45 passing axially through the top terminal end 42, the body portion 47, and the element post end 43 and adapted to receive an element post 30. The bushing 40 may be formed from any of the several lead-based alloys that are known for lead-acid battery terminals. Lead-based alloys are known and are conventionally used. Conventional casting techniques may be employed to allow easy fabrication of the bushing 40. While the bushing 40 could be formed in multiple pieces and then welded together, generally no advantage would be provided thereby. On the other hand, the unitary casting of the bushing 40 contributes to producing a strong, sturdy bushing which is not easily broken during normal use.

Figure 4:
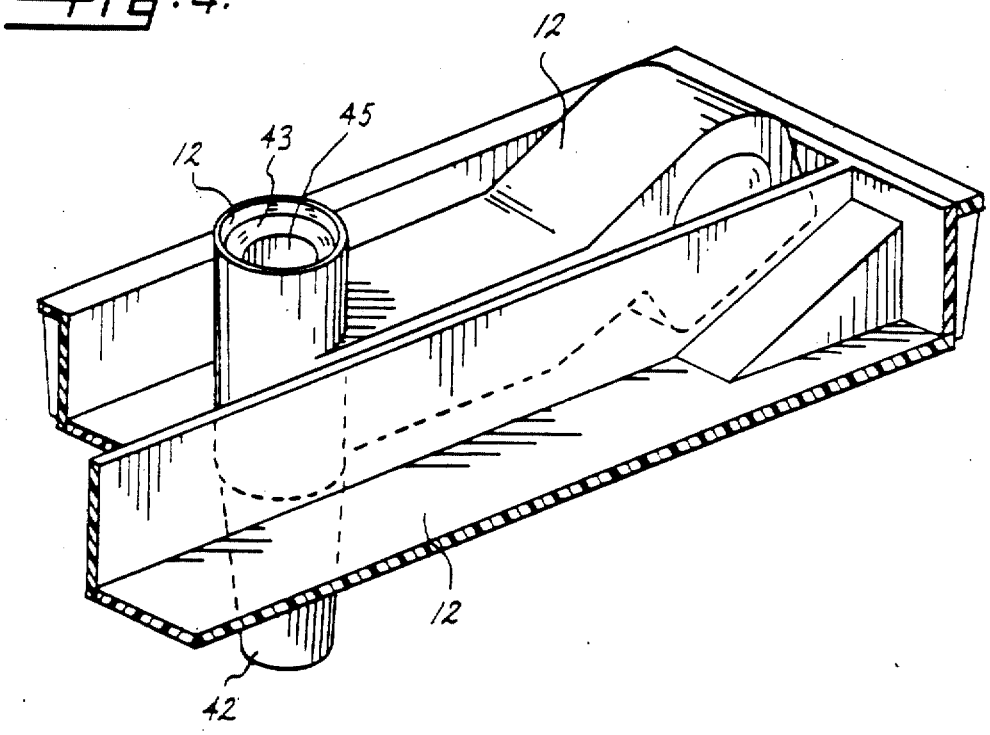
FIG. 4 is a perspective of the undersurface of a corner of inverted cover 12 of the battery shown in FIG. 1 further illustrating the mounting of the bushing 40 in the cover 12.

Except for their top terminal ends 42, the bushings 40, in accordance with another preferred aspect of the invention and as best shown in FIGS. 3 and 4, are substantially completely embedded in the cover 12. By embedding the bushing 40 substantially completely in the cover 12, the length of the plastic/bushing seal and, accordingly, the electrolyte creepage path are increased. Embedding the bushing 40 substantially completely also increases the durability of the seal and of the bushing 40 as compared to conventional bushings mounted in relatively thin walls. The bushing 40 may be embedded by conventional techniques, e.g., by pre-casting the bushing 40 and placing it in the mold during injection molding of the cover 12.

The top terminals 21 are in electrical communication with the top terminal ends 42 of the bushings 40, but, in accordance with a preferred feature of this invention, are not a separate part per se. Rather, they are formed, inter alia, from the top terminal ends 42 of the bushings 40 and the element post 30. That is, the top terminals 21 are formed during and result from the welding of the bushings 40 and the element posts 30. Accordingly, whereas FIGS. 1 and 2 illustrate the formed top terminals 21, FIG. 3 illustrates the component parts, i.e., the top terminal ends 42 and the element posts 30, from which the top terminals 21 are formed. The welding itself may be accomplished by conventional techniques, e.g., welding, with or without the use of a weld fill. The top terminals 21, if necessary, then are trimmed to the desired height. Preferred methods of induction welding the bushings 40 and element posts 30 are disclosed, e.g., in U.S. Pat. No. 3,908,739 to R. Cushman U.S. Pat. No. 3,908,740 to R. Schenk, Jr. et al.; U.S. Pat. No. 3,908,741 to A. Keizer; U.S. Pat. No. 3,909,301 to R. Schenk, Jr., et al.; and references cited therein. In contrast to designs which utilize a separate post shaped element threaded into or welded to a bushing, a sturdier, more reliable top terminal is provided by forming it in this manner.

As best shown in FIGS. 1 and 2, another feature of the subject invention is that the top terminals are centered, or approximately centered, i.e., they are located on or in the vicinity of the longitudinal centerline of the battery cover. Positioning of the top terminals on or in the vicinity of the center longitudinal line of the battery cover not only contributes to standardization, but it requires a commensurate lengthening of the connecting arm 44 of the bushing 40. By extending the length of the connecting arm 44, the length of the plastic/bushing seal, through which electrolyte creepage may occur, is increased. Increased length also contributes to greater strength, resistance to vibration, and therefore longer service life of both the plastic/bushing seal and the bushing.

As best shown in FIGS. 3, 5, and 6 and in accordance with a preferred feature of the subject invention, the connecting arm 44 has a relatively large cross section, which in turn further contributes to greater strength and longer service life of the bushing. Preferably, the cross sectional area of the connecting arm 44 is approximately equal to that of the top terminals 21. Accordingly, the bushing 40 is able to conduct electricity to the side terminals 20 at substantially the same rate and with substantially equal efficiency as to the top terminals 21.

The side terminals 20 are in electrical communication with the side terminal ends 41 of the bushings 40. In accordance with a preferred feature of this invention, the side terminals 20 are embedded in the side terminal end 41 of the bushings 40 and comprise threaded nuts of hard material, such as steel. Other side terminal configurations may be provided, e.g., as by threading the side terminal end of the bushing or by welding or otherwise attaching a post terminal. By utilizing the preferred embodiment, however, the side terminal is resistant to over tightening of the side terminal connections and provides excellent electrical conduction thereto from the side terminal ends 41 of the bushings 40.

As best shown in FIGS. 1, 3, 5, and 6, and in accordance with this invention, the side terminals 20, together with the side terminal ends 41 of the bushings 40, face the plane generally contiguous with the top surface of the cover 12 at an acute angle $\theta$ and are mounted generally on a contiguously angled surfaces 13 molded into two adjacent corners of the cover 12. The tilting of the side terminals 20, i.e., disposing them on the angled surfaces 13, exposes the side terminals 20, as compared to side terminals mounted through a vertical wall of the container or cover, and provides for greater ease in connecting and disconnecting side terminal connectors.

The tilting of the side terminals 20, also contributes to reducing leakage, particularly in wet batteries. By tilting the side terminals 20, the lowermost portion of the plastic/bushing seal at the side terminal end 41 no longer is strictly horizontal, i.e., electrolyte creepage is retarded by gravitational forces, and is further removed from the electrolyte level 14. Both factors contribute to reducing electrolyte creepage. Moreover, as shown in FIGS. 3 and 5, it also is possible to mount the side terminal 20 in the battery cover 12 while shortening the lengths of the cover sides. The shorter the cover sides, given the same overall space constraints, the further removed is the heat seal 15 between the battery cover 12 and container 11 from the electrolyte level 14. It has been found that when $\theta$ equals substantially 20° to 30°, the side terminals are readily accessible and, as shown in FIG. 3, it is possible to mount the side terminals 20 in the cover 12, maintain a relatively high electrolyte level 14, and still situate the bushing/plastic and container/cover seals well above the electrolyte level 14. Of course, that value is not generally critical, and the surfaces 13 may be disposed at other acute angles.

Ribs 46 are disposed along the element post end 43, the body portion 47, and the connecting arm 44 of the bushings 40, although if desired, similar ribs could be provided along any and all parts of the bushings 40 which are embedded in the cover 12. The inclusion of ribs 46 on the bushing 40 is believed to decrease leakage by increasing the length of the seal. The ribs 46 also enhance the strength of the bushing/plastic seal and of the bushing 40 and, therefore, their durability.

The element posts 30 are of generally cylindrical shape and are designed to be inserted into and welded to, as described in detail above, the generally cylindrical holes 45 in the top terminal ends 42, body portions 47, and element post ends 43 of the bushings 40. Other configurations for the element posts 30 are acceptable, e.g., solid right rectangular shaped posts, provided the holes 45 in the bushings 40 are modified accordingly. The element posts 30, preferably as an integral part of the terminal conducting strap 31, may be made by casting conventional alloys, such as those based on lead, by conventional methods, generally as described above in reference to the bushing 40. The element posts 30 are electrically connected to the electrochemical components, and more particularly, to the terminal conducting straps 31, which in turn are electrically associated with the other electrochemical components. Those components, however, are of conventional construction, as described herein, and form no part of the subject invention. Accordingly, a variety of conventional electrochemical components may be utilized in the subject invention.

Figure 7:
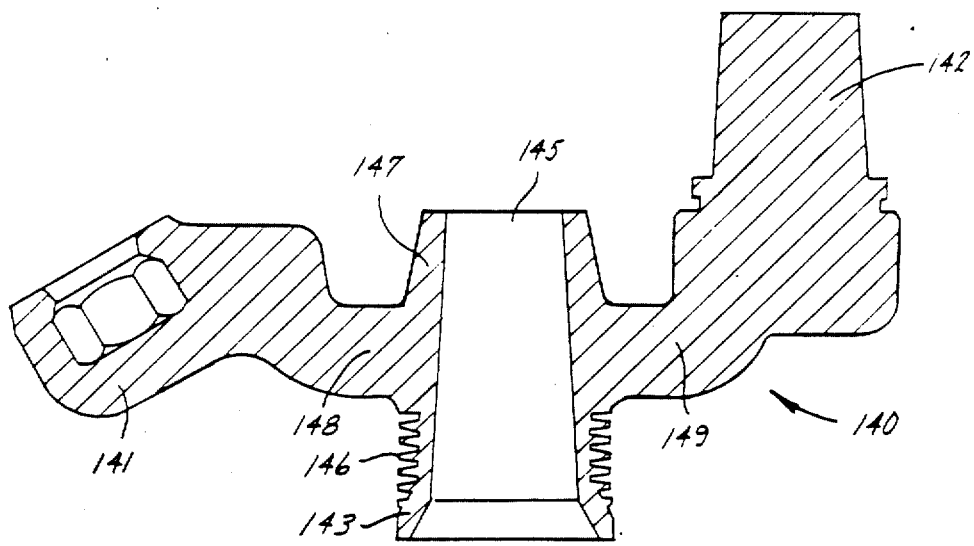
FIG. 7 is a cross-sectional view of a bushing which is comprised by another preferred embodiment of the subject invention.

Another preferred embodiment of the battery of the subject invention may comprise the bushing 140 shown in FIG. 7. As best shown therein, bushing 140 comprises a body portion 147, a side terminal end 141, a top terminal end 142, an element post end 143, connecting arms 148 and 149 extending from the body portion 147 to, respectively, the side terminal end 141 and top terminal end 142, and a generally cylindrical hole 145 passing axially through the body portion 147 and element post end 143 and adapted to receive an element post. It will be appreciated that preferably the transverse cross sectional area of the connecting arms 148 and 149 and their lengths are approximately equal. Thus, the bushing 140 is able to conduct electricity to its side terminal end 141 and top terminal end 142 at substantially equal rates and efficiencies. Although the decrease in the length of the connecting arm 148, as compared to the connecting arm 44 of the bushing 40, correspondingly decreases the electrolyte creepage path, the electrical conduction properties of bushing 140 are improved over bushing 40 thereby. Moreover, the combined lengths of connecting arms 148 and 149 being substantially equal to that of connecting arm 44, the same benefits of increased strength and resistance to vibration are imparted to bushing 140 and the plastic/bushing seal.

It should be noted that, in contrast to those of bushing 40, the top terminal ends 142 of bushings 140 are the top terminals and are not fused to the element posts to form the top terminals. In other particulars, however, the bushing 140 is made and used in substantially the same manner as shown and described herein in reference to bushing 40.

While this invention has been disclosed primarily in terms of specific embodiments thereof, it is not intended to be limited thereto. Other modifications and embodiments will be apparent to the worker in the art. For example, the invention has been described primarily in the context of a lead-acid, multicell battery for an automotive SLI application, but it should be appreciated that such battery may be utilized in other vehicles and applications. Additionally, the electrochemical system need not be based on lead-acid, but may be other electrochemical systems, if desired.

What is claimed is:

1. A dual terminal, electric storage battery comprising:
    (a) a container;
    (b) a cover;
    (c) a single pair of element posts in electrical communication with electrochemical components;
    (d) a single pair of terminal bushings substantially completely embedded in said cover, each of said bushings being electrically connected to one of said element posts and comprising, (i) a body portion, (ii) a side terminal end, which side terminal end is mounted through an opening in an angled surface of said cover, which angled surface is at an angle acute to the plane generally contiguous to the top surface of said cover, (iii) a top terminal end, which top terminal end is mounted through an opening in said top surface of said cover on or in the vicinity of its longitudinal center line, (iv) an element post end, (v) a first connecting arm extending sideways from said body portion to said side terminal end, (vi) a second connecting arm extending sideways from said body portion to said top terminal end, wherein said body portion and said element post end define a hole passing axially therethrough and adapted to receive therein one of said element posts;

(e) a pair of side terminals in electrical communication with said side terminal ends of said bushings; and (f) a pair of top terminals in electrical communication with said top terminal ends of said bushings.

2. The battery of claim 1, wherein said first and said second connecting arms have approximately equal transverse cross-sectional areas and lengths.

3. The battery of claim 1, wherein said side terminals are threaded, steel nuts embedded in said side terminal ends of said bushings.

4. The battery of claim 2, wherein said side terminals are threaded, steel nuts embedded in said side terminal ends of said bushings.

5. The battery of claim 1, wherein said bushing is provided with one or more ribs disposed along the surfaces of said bushing.

6. The battery of claim 4, wherein said bushing is provided with one or more ribs disposed along the surfaces of said bushing.

7. The battery of claim 1, wherein said battery is a wet, dual terminal, electric storage battery.

8. The battery of claim 6, wherein said battery is a wet, dual terminal, electric storage battery.

9. The battery of claim 2, wherein said bushing is provided with one or more ribs disposed along the surfaces of said bushing.

10. The battery of claim 3, wherein said bushing is provided with one or more ribs disposed along the surfaces of said bushing.

11. The battery of claim 1, wherein said battery is a recombinant, dual terminal, electric storage battery.

12. The battery of claim 6, wherein said battery is a recombinant, dual terminal, electric storage battery.

* * * * *